United States Patent

Anderson et al.

Patent Number: 5,788,368
Date of Patent: Aug. 4, 1998

[54] WIRE WHISK

[75] Inventors: Robert J. Anderson, 51 Woodridge Ct., Cheshire, Conn. 06410; John W. Jeracka, Cheshire, Conn.

[73] Assignee: Robert J. Anderson, Cheshire, Conn.

[21] Appl. No.: 922,907

[22] Filed: Sep. 3, 1997

[51] Int. Cl.$^6$ .................................................. A47J 43/10
[52] U.S. Cl. ........................................ 366/129; 416/70 R
[58] Field of Search ........................... 366/129, 130, 366/342–344; 15/141.1, 141.2; 99/348; 416/69, 70 R, 227 R, 231 A; D7/376–380, 412, 688, 690

[56] References Cited

U.S. PATENT DOCUMENTS

| | | | |
|---|---|---|---|
| 866,909 | 9/1907 | Brenner | 366/343 X |
| 884,085 | 4/1908 | Genge | 366/343 X |
| 1,910,302 | 5/1933 | Maslow | 416/70 |
| 2,208,337 | 7/1940 | Maslow | 416/70 |
| 4,735,510 | 4/1988 | Barbour et al. | 366/343 |

*Primary Examiner*—Charles E. Cooley
*Attorney, Agent, or Firm*—McCormick, Pauliding & Huber

[57] ABSTRACT

A whisk having axially elongated handle assembly and a plurality of resilient wire whisk elements mounted in fixed position on the handle assembly and defining a wire cage projecting axially outwardly from the handle assembly and having a conical outer end portion diverging from an apex at the outer end of the whisk and in the direction of the handle assembly.

18 Claims, 2 Drawing Sheets

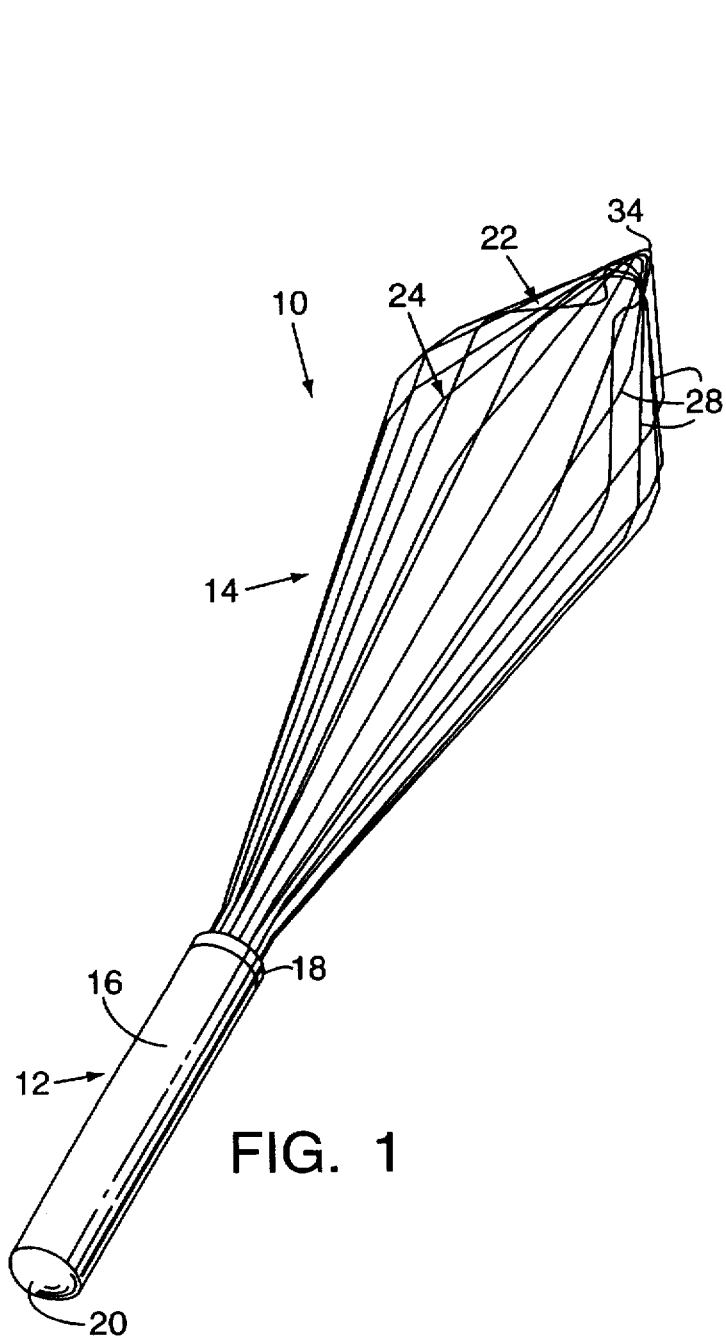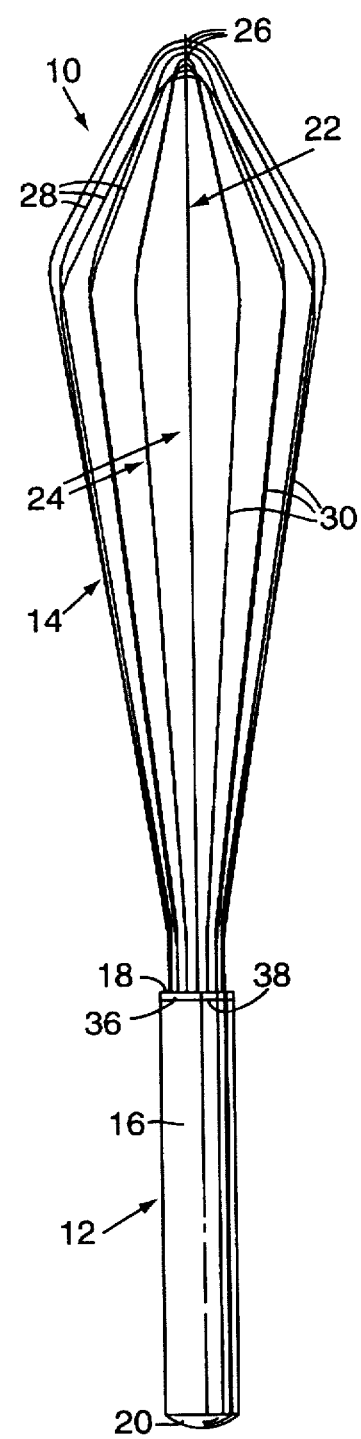

WIRE WHISK

BACKGROUND OF THE INVENTION

This invention relates in general to kitchen utensils used in food preparation and deals more in particularly with an improved wire whisk for hand whipping or beating sauces, gravies and the like.

Those responsible for the preparation of food for service in clubs, institutions, restaurants and other commercial establishments appreciate the requirement for rapid and efficient in food preparation with minimal waste. Hand powered beaters and wire whisks of the type generally heretofore available usually have a bulbous or balloon shaped end configuration and are well adapted for use in hand whipping or beating sauces and gravies, but are not particularly suitable for use with a sauce pan, china cap or chinoise. An economy minded chef using such a bulbous kitchen utensil in the preparation of a sauce or gravy will often employ a spatula or other more suitably shaped kitchen tool to remove fond from the bottom and sides of a roasting pan for use in the preparation of gravy or to salvage a food product such as a sauce which may adhere to the walls of a container or sieve in which it has been prepared. The use of two or more such kitchen utensils where one more suitable utensil might suffice is inefficient, substantially increases the time required for food preparation, and adds substantially to the clean up chore which must be performed to ready the utensils for further use.

Accordingly, it is the general aim of the present invention to provide an improved hand operated whisk better suited its purpose than presently available kitchen utensils of a generally similar kind. A further aim of the invention is to provide an improved whisk which may be efficiently employed and readily cleaned.

SUMMARY OF THE INVENTION

In accordance with the present invention a wire whisk is provided which comprises an axially extending handle assembly and an axially elongated wire cage supported on and projecting generally axially outwardly from the handle assembly. The cage is defined by a plurality of resilient wire whisk elements, each element having inner ends connected to the handle assembly. The whisk elements have reversely bent outer end portions which diverge from an apex at the outer end portion of the whisk and in the direction of the handle assembly to define a conical outer end portion of the cage.

BRIEF DESCRIPTION OF THE DRAWINGS

FIG. 1 is a perspective view of a wire whisk embodying the present invention.

FIG. 2 is a somewhat enlarged side elevational view of the whisk shown in FIG. 1.

DETAILED DESCRIPTION OF PREFERRED EMBODIMENT

Figure 3:
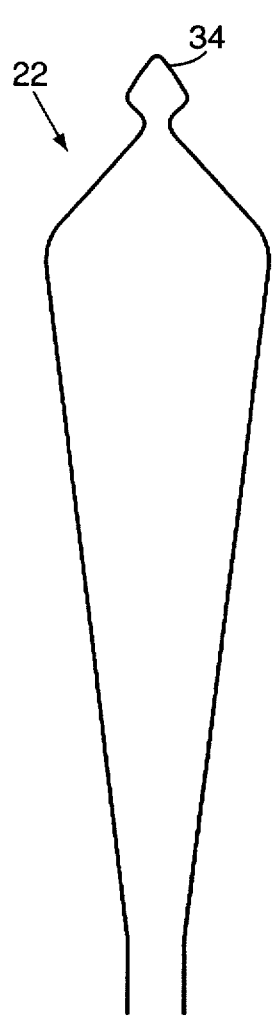
FIG. 3 is a side a elevational view of a typical primary wire whisk element.

Turning now to the drawings, and referring first particularly to FIGS. 1 and 2, a wire whisk embodying the present invention is indicated generally by the reference numeral 10. The illustrated whisk 10 is a heavy duty kitchen utensil particularly adapted to be used in restaurant kitchens and the like to prepare sauces and gravies. The whisk essentially comprises a handle assembly, indicated generally at 12, and a wire cage, designated generally by the numeral 14, supported on the handle assembly. The cage is formed by a plurality of discrete wire whisk elements. Each of the whisk elements and the various other components used to make the whisk 10 are preferably made from stainless steel.

Considering now the whisk 10 in further detail, the handle assembly may take various forms, but preferably, and as shown, the handle assembly 12 comprises an axially elongated generally cylindrical tubular handle member 16 which has an insert 18 received in its outer end for supporting the various whisk elements. A cap 20 secured in the inner end of the tubular handle member 16 provides a substantial sealing closure for the inner end of the handle assembly.

Figure 4:
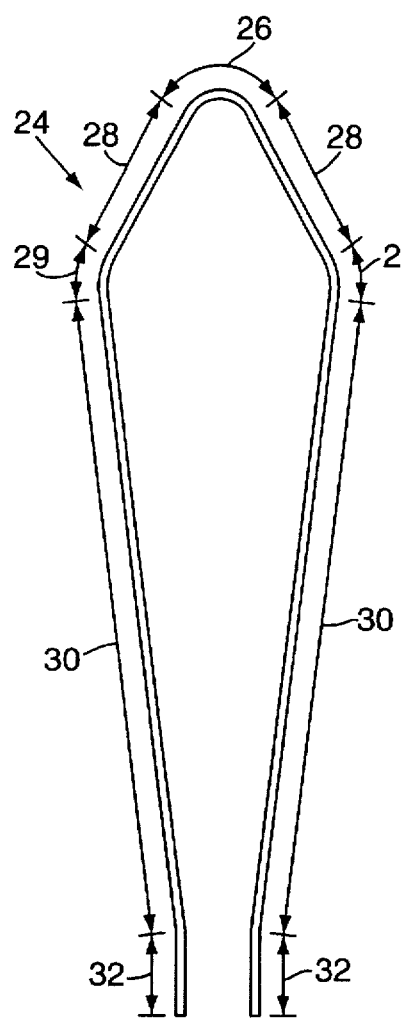
FIG. 4 is a side elevational view of a typical secondary wire whisk element.
Figure 5:
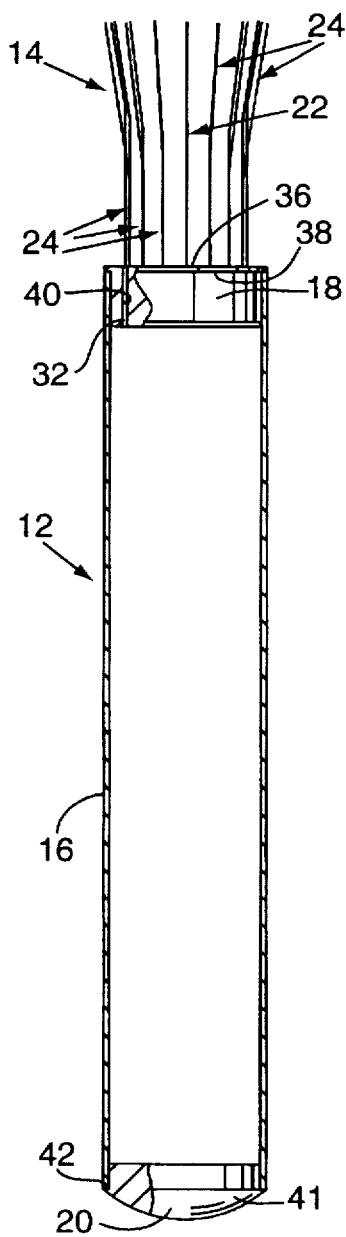
FIG. 5 is a somewhat further enlarged fragmentary sectional view through the handle assembly shown partially in axial section.
Figure 6:
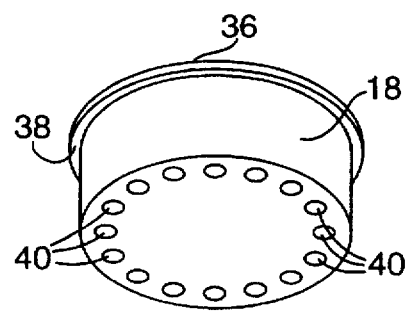
FIG. 6 is a somewhat enlarged perspective view of a handle insert.

The whisk cage 14 is formed by a single main or primary wire whisk element indicated generally at 22 in FIG. 3 and a plurality of substantially identical secondary wire whisk elements designed generally by the numeral 24, 24 and best shown in FIG. 4. The secondary wire whisk elements are supported on the handle assembly 12 by the insert 18. Each of the wire whisk elements 22 and 24, 24 is formed from an axially elongated generally cylindrical length of resilient stainless steel wire having a uniform cross section throughout its entire length.

A typical secondary wire whisk element 24, shown in FIG. 4, includes a reversely bent central apex portion, indicated at 26, and a pair of substantially rectilinear portions 28, 28 integrally connected to and diverging from the apex portion 26. Another pair of rectilinear portions 30, 30 integrally connected to the ends of the rectilinear portions 28, 28 by arcuate connecting portions 29, 29, substantially as shown, converge inwardly toward each other in the direction. The inner or free end portions of the illustrated wire whisk 24, indicated at 32, 32 are brought into parallel alignment with each other for assembly and may be bent into substantially parallel relation to each other prior to assembly, and as shown in FIG. 4, to facilitate assembly of the whisk element 24 with the handle assembly 12.

The primary wire whisk element 22 is, in most respects, similar to the secondary wire whisk element 24, previously described, but differs from it in that the reversely bent apex portion of the primary element 22, has a diamond shaped configuration defining an open loop and indicated at 34.

The insert 18, which supports the primary wire whisk element 22 and the various secondary wire whisk elements 24, 24 comprises a generally cylindrical plug adapted to be received within and complement the opening in the outer end of the cylindrical tubular handle member 16. The cylindrical insert 18 has a radially outwardly projecting annular flange 36 at its outer end which has an axially inwardly facing annular seating surface 38 for engaging an axially outwardly facing annular outer end surface of the tubular handle member 16 when the insert is assembled with the handle member. A circumaxial series of equiangularly spaced and axially parallel cylindrical holes 40, 40 are formed in the insert 18 and sized to receive and generally complement free end portions of the primary wire whisk element 22 and the secondary wire whisk elements 24, 24. In accordance with presently preferred construction, a single primary whisk element 22 and seven discrete secondary whisk elements 24, 24 are supported on the handle assembly 12.

The opposite end portions of the primary whisk element 22 are received in a diametrically opposite pair of holes 40, 40 in the insert 18. The opposite free end portions of each secondary wire whisk element 24 are also received in a pair of associated diametrically holes 40, 40 in the insert 18. Each secondary whisk element 24 is arranged relative to the other of the secondary wire whisk elements 24, 24 so that the apex portions of the various secondary whisk elements are in close proximity to each other when the whisks are assembled with the insert 18. The cage 14 is completed by assembling the primary wire whisk element 22 with the insert, the inner end portions of the primary wire whisk element being inserted into diametrically opposite holes 40, 40 in the insert. When the assembly is completed the apex portions of the various secondary wire whisk elements 24, 24 are captured within the open loop 34 at the apex of the primary whisk element. The primary whisk element or more specifically, the loop 34 at the apex portion of the primary element which captures the apex portions of the secondary wire whisk elements prevents the various secondary whisk elements from separating from each other at the outer end of the whisk 10.

The various components which comprise the whisk 10 may be joined together in assembly by welding or any other suitable means. However, in accordance with presently preferred construction, the various secondary wire whisk elements 24, 24 and the primary wire whisk element 22 are maintained in assembly with the insert 18 by an epoxy resin adhesive compound. The same compound is preferably employed to assemble the insert within the tubular handle member 16.

The end cap 20 is assembled within the inner end of the handle member 16 and provides a sanitary moisture-tight closure for the inner end of the handle member and includes a radially disposed annular flange 42 which defines a seating surface 42 for seating engagement with a radially disposed surface at the inner end of the handle member. In accordance with presently preferred construction the end cap 20 is also secured to the handle member 16 by an epoxy resin compound.

The resilient wire whisk elements 22 and 24, 24 cooperate in assembly to define the cage 14 which projects axially outwardly from the handle assembly. In accordance with the invention, the outer end portion of the cage 14 is generally conical and diverges in axially inward direction or toward the handle assembly from an apex at the outer end of the whisk. The portions of the wire whisk elements disposed between the conical portion and the handle assembly define a generally frustoconical portion of the cage. The particular shape of the whisk adapts it for use in removing fond from the bottom and sides of a roasting pans, for example, and for salvaging a food product such as a sauce which may adhere to the wall of a container or conical sieve used in preparing the food product.

We claim:

1. A whisk comprising an axially elongated handle assembly, a plurality of discrete elongated resilient wire whisk elements, each of said wire whisk elements having opposite ends secured in fixed positions to said handle assembly, each of said wire whisk elements extending outwardly in a generally axially direction from said handle assembly, said wire whisk elements cooperating with each other to define a cage having a generally axially extending conical outer end portion diverging from an apex at the outer end of the whisk and in the direction of said handle assembly.

2. A whisk as set forth in claim 1 wherein the axis of said conical portion is generally coincident with the axis of said handle assembly.

3. A whisk as set forth in claim 2 wherein each of said whisk elements is disposed in a respectively associated axial plane.

4. A whisk as set forth in claim 3 wherein the axial planes in which the whisk elements are disposed are generally equiangularly spaced about the axis of said handle assembly.

5. A whisk as set forth in claim 1 wherein one of said wire whisk elements comprises a primary whisk element including retaining means for securing associated apex portions of the other of said whisk elements in general relation to each other proximate said apex of said cage.

6. A whisk as set forth in claim 5 wherein said retaining means comprises an open loop formed by said primary whisk element and said associated apex portions of said other of said whisk elements are disposed within said open loop.

7. A whisk as set forth in claim 6 wherein said open loop is defined by a diamond shaped portion of said primary wire whisk element.

8. A whisk as set forth in claim 1 wherein said cage includes a generally frustoconical portion disposed between said conical outer end portion and said handle assembly.

9. A whisk as set forth in claim 1 wherein said handle assembly includes a tubular handle member and an insert received and secured in said tubular handle member and said opposite ends are secured in fixed position to said insert.

10. A whisk as set forth in claim 9 where said opposite ends are secured to said insert member by an epoxy compound.

11. A whisk as set forth in claim 9 wherein said handle assembly includes an end cap forming a closure for one end of said tubular handle member.

12. A whisk as set forth in claim 1 wherein said resilient wire whisk elements are further characterized as cylindrical wire elements and each of said cylindrical wire elements has a uniform diameter throughout its length.

13. A whisk comprising an axially elongated handle assembly, a plurality of elongated generally cylindrical resilient wire whisk elements having opposite ends secured in fixed positions to said handle assembly, said wire whisk elements projecting axially outwardly from said handle assembly, each of said wire whisk elements having a uniform diameter throughout its length, said wire whisk elements being disposed in respectively associated axial planes equiangularly spaced about the axis of said handle assembly, said wire whisk elements cooperating with each other to define a resilient wire cage, said cage including a generally conical outer end portion terminating at an apex and diverging from said apex and in the direction of said handle assembly, said cage having an integral frustoconical portion disposed generally between said handle assembly and said conical portion, one of said wire whisk elements having retaining means for securing associated portions of the other of said wire whisk elements in generally equiangularly spaced relation to each other proximate the apex of said cage, said retaining means including an open loop through which said associated portions pass.

14. A whisk as set forth in claim 13 wherein said one of said wire whisk elements has a generally diamond shaped position defining said open loop.

15. A whisk as set forth in claim 13 wherein said handle assembly includes a generally cylindrical tubular handle member, an insert supported on and providing a closure for an end of said tubular handle member, said insert having a circumaxial series of equiangularly spaced mounting holes equal in number to said opposite ends and receiving and supporting said opposite ends therein.

16. A whisk as set forth in claim 15 wherein said opposite ends are secured to said insert by an epoxy compound.

17. A whisk as set forth in claim 16 wherein said handle assembly includes an end cap mounted in said tubular handle member and providing a closure for said tubular handle member.

18. A sauce whisk comprising; an axially extending handle assembly and an axially elongated wire cage supported on and extending generally coaxially outwardly from said handle assembly, said cage being defined by a plurality of discrete resilient wire whisk elements, each of said wire whisk elements having opposite ends connected to said handle assembly and a central reversely bent portion generally defining an apex at the axially outer end of said cage, said cage having a conical outer end portion converging to said apex.

* * * * *